United States Patent [19]

Knooihuizen

[11] Patent Number: 5,499,474
[45] Date of Patent: Mar. 19, 1996

[54] METHOD AND APPARATUS FOR LIQUID APPLICATION

[76] Inventor: Louis D. Knooihuizen, 3530 Navaho Dr., Grandville, Mich. 49418

[21] Appl. No.: 345,927

[22] Filed: Nov. 28, 1994

[51] Int. Cl.$^6$ ................................................. A01G 13/00
[52] U.S. Cl. .............................................. 47/1.5; 401/10
[58] Field of Search ................................. 47/1.5; 401/9, 401/10

[56] References Cited

U.S. PATENT DOCUMENTS

| | | | |
|---|---|---|---|
| 1,297,567 | 3/1919 | Johnson | 401/10 |
| 2,788,537 | 4/1957 | Greenberg | 401/10 |
| 4,597,219 | 6/1986 | Kropf . | |
| 4,644,604 | 2/1987 | Kierce | 401/10 |
| 4,716,677 | 1/1988 | Moore . | |
| 4,727,678 | 3/1988 | Struve et al. . | |
| 4,803,801 | 2/1989 | Nelson, Jr. . | |
| 4,894,948 | 1/1990 | Eubanks . | |
| 4,947,580 | 8/1990 | Moore . | |
| 5,216,833 | 6/1993 | Longer . | |

FOREIGN PATENT DOCUMENTS

| | | | |
|---|---|---|---|
| 718042 | 2/1942 | Germany | 47/1.5 |
| 929758 | 7/1955 | Germany | 47/1.5 |

*Primary Examiner*—Terry Lee Melius
*Assistant Examiner*—Joanne C. Downs
*Attorney, Agent, or Firm*—Varnum, Riddering, Schmidt & Howlett

[57] ABSTRACT

An applicator assembly for the controlled application of fluid to a surface is disclosed. The applicator assembly includes a bottle, a pump trigger mechanism, a hand-held applicator and a solution conduit extending between the hand-held applicator and the trigger mechanism. The applicator includes a pair of opposed pads which receive fluid from the bottle through the conduit and a clamping projection for controlling the flow of fluid through the conduit into the applicator pad.

19 Claims, 4 Drawing Sheets

METHOD AND APPARATUS FOR LIQUID APPLICATION

BACKGROUND OF THE INVENTION

1. Field of the Invention

This invention relates to a method and apparatus for the controlled application of liquid and, more particularly, to a spray bottle and applicator for the controlled application of liquid to a surface, such as a plant.

2. Description of the Related Art

A wide variety of liquid products are now sold in spray or pump bottles. While the pump or trigger mechanisms are efficient means for extracting the liquid from the dispenser bottle, the spray pattern created by the nozzle of the trigger mechanism is inappropriate for some liquids. For example, certain herbicides such as weed killers cannot be indiscriminately sprayed onto an offending weed. While the weed which is sprayed would be killed by the herbicide, so would all other surrounding vegetation which is contacted by the herbicide, which is often inappropriate.

There have been numerous previous attempts to develop applicators for the controlled application of liquids, such as herbicides. Examples of such devices are seen in U.S. Pat. No. 4,947,580 to Moore; U.S. Pat. No. 4,716,677 to Moore; U.S. Pat. No. 4,894,948 to Eubanks; U.S. Pat. No. 4,803,801 to Nelson, Jr.; U.S. Pat. No. 4,727,678 to Struve et al.; U.S. Pat. No. 4,597,219 to Kropf; and U.S. Pat. No. 5,216,833 to Longer.

While several of these applicators control the application of liquid from a reservoir, none of these devices are suitable for use with a pump bottle. In addition, control of the flow of the liquid between the reservoir and the application surface is limited. When using toxic chemicals such as herbicides, controlling the relative flow of the product between the applicator and the reservoir can be critically important.

SUMMARY OF THE INVENTION

The applicator bottle and method for applying liquid according to the invention overcome the problems of the prior art by incorporating a pump or trigger mechanism for supplying liquid to the applicator and includes sufficient means between the solution reservoir and the applicator to control the flow of liquid therebetween.

The applicator assembly for the controlled application of fluid to a surface comprises a fluid reservoir and a pump mechanism having an inlet and an outlet. The inlet of the pump mechanism is in fluid communication with the fluid reservoir. A fluid conduit is mounted to the outlet of the pump mechanism and has a proximal end and a distal end. An applicator is mounted to the distal end of the fluid conduit and comprises a pair of opposed support members moveable with respect to one another between first and second positions. In the first position, a portion of one support member is disposed away from a portion of the other support member. In the second position, the portion of each support member is disposed nearer to each other. At least one applicator pad is mounted to the portion of one of the support members. At least one applicator pad is in fluid communication with the fluid conduit. A spring is mounted in the applicator to bias the opposed support members into the second position. A clamping projection is positioned to compress the fluid conduit between the pump mechanism and the at least one application pad when the opposed support members are in one of the first and second positions. Fluid is selectively supplied to the at least one applicator pad from the fluid reservoir by pumping the pump mechanism to supply fluid to the fluid conduit and biasing the opposed support members to the other of the first and second positions so that the fluid in the fluid conduit flows to the at least one applicator pad.

The invention is also directed to a method for the controlled application of liquid to a surface. The method comprises the steps of providing an applicator having a fluid reservoir and a pump mechanism, the pump mechanism having an inlet and an outlet. The inlet of the pump mechanism is in fluid communication with the fluid reservoir. A fluid conduit is mounted to the outlet of the pump mechanism and an applicator is mounted to the distal end of the fluid conduit. The applicator comprises a pair of opposed support members moveable with respect to one another between first and second positions and at least one applicator pad mounted to one of the support members, the pad being in fluid communication with the fluid conduit. A spring is mounted to the applicator to bias the opposed pad support members into the first position and a clamping projection is provided to selectively compress the fluid conduit between the pump mechanism and the applicator pad when the opposed support pad members are in one of the first and second positions. Next, the pump mechanism is actuated to draw fluid from the reservoir into the fluid conduit. The pair of opposed support members are moved to the other of the first and second positions thereby allowing the fluid to flow from the first conduit into to the at least one applicator pad. Finally, the surface to receive the fluid is contacted with the at least one applicator pad to cause the fluid in the pad to flow onto the surface.

BRIEF DESCRIPTION OF THE DRAWINGS

The invention will now be described with reference to the drawings in which.

DETAILED DESCRIPTION OF THE PREFERRED EMBODIMENTS

Figure 1:
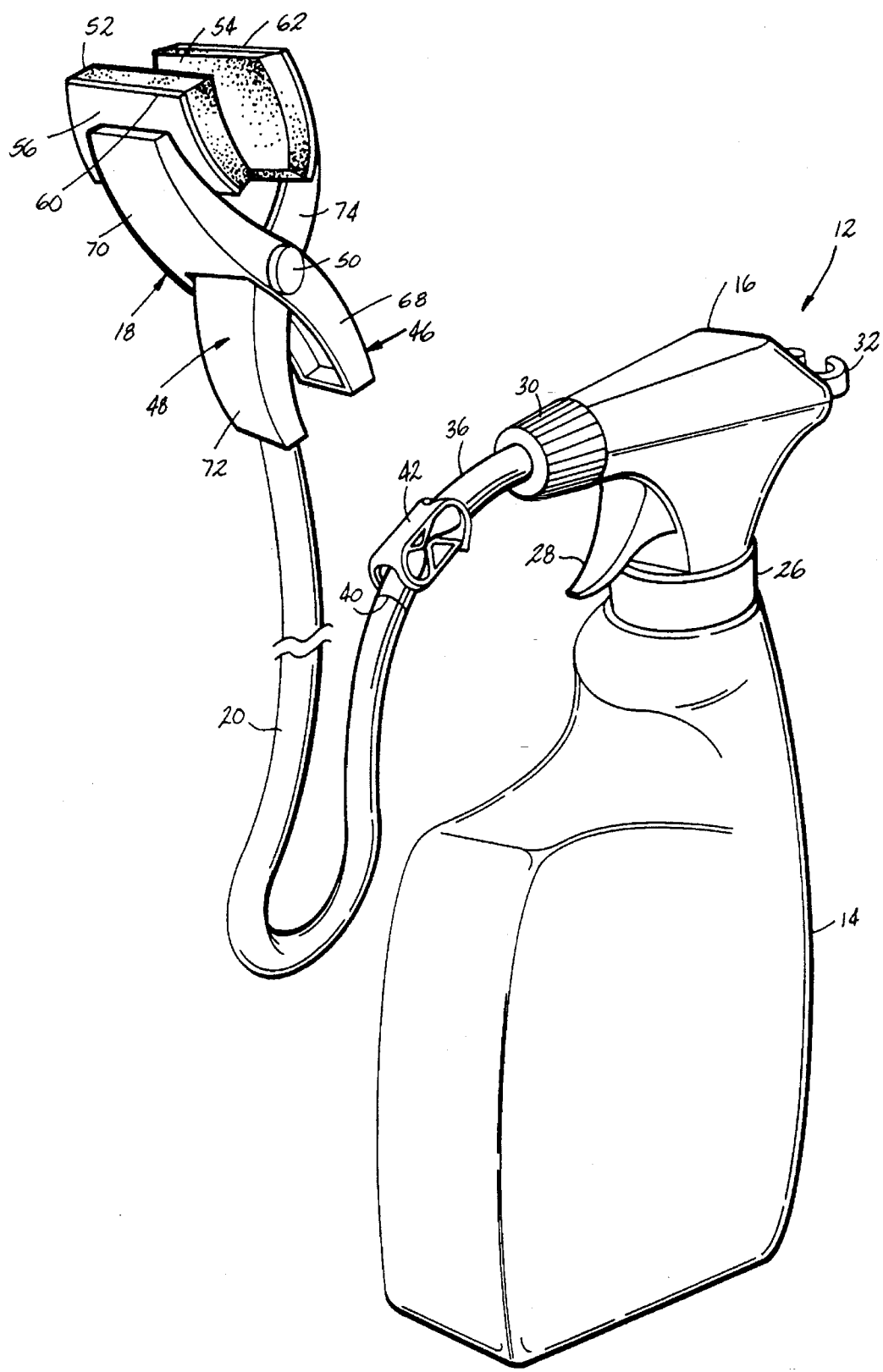
FIG. 1 is a perspective view of the liquid applicator assembly according to the invention.

Referring now to the drawings and to FIG. 1 in particular, the applicator assembly 12 according to the invention comprises a liquid reservoir or bottle 14, a pump or trigger mechanism 16 mounted to the top of the bottle 14, an applicator 18 and a solution conduit 20 extending between the pump mechanism 16 and the applicator 18.

The bottle 14 is hollow and stores a supply of liquid to be distributed through the applicator assembly 12. The bottle 14 has a conventional threaded opening (not shown) formed in the top thereof which receives a threaded mounting collar 26 of the pump mechanism 16. A finger operated trigger 28 extends downwardly from the underside of the pump mechanism 16 and an outlet nozzle 30 is formed on the front of the pump mechanism. A U-shaped retaining clip 32 is mounted to the body of the pump mechanism 16, the collar 26 or the bottle 14. Preferably, the clip is mounted to the pump mechanism seen in FIG. 1. The internal workings of the pump mechanism are conventional and well-known. A pick-up tube extends downwardly from the pump mechanism 16 into the bottle 14. The trigger 28 is interconnected to suitable means in the pump mechanism for drawing the liquid upwardly through the pick-up tube and discharging it, under pressure, out of the outlet nozzle 30 in response to squeezing of the trigger 28.

A proximal end 36 of the solution conduit 20 is mounted to the outlet nozzle 30 and adapted to receive liquid from the bottle 14 through the pump mechanism 16. The distal end 38 of the solution tube is mounted to the applicator 18 thereby establishing fluid communication between the bottle 14 and the applicator 18. At least one fill line 40 or other means for measuring the amount of liquid within the solution conduit 20 are formed on the conduit 20 intermediate the proximal and distal ends 36, 38. The fill line 40 or other measuring means can be used to precisely measure the amount of fluid drawn from the bottle 14 into the solution conduit. Preferably, the solution conduit 20 is formed from a transparent or translucent material such that the amount of liquid inside the solution conduit 20 can be observed. In addition, a conventional stop clamp 42 is mounted to the conduit 20 adjacent the outlet nozzle 30 to control the flow of fluid therethrough.

Figure 2:
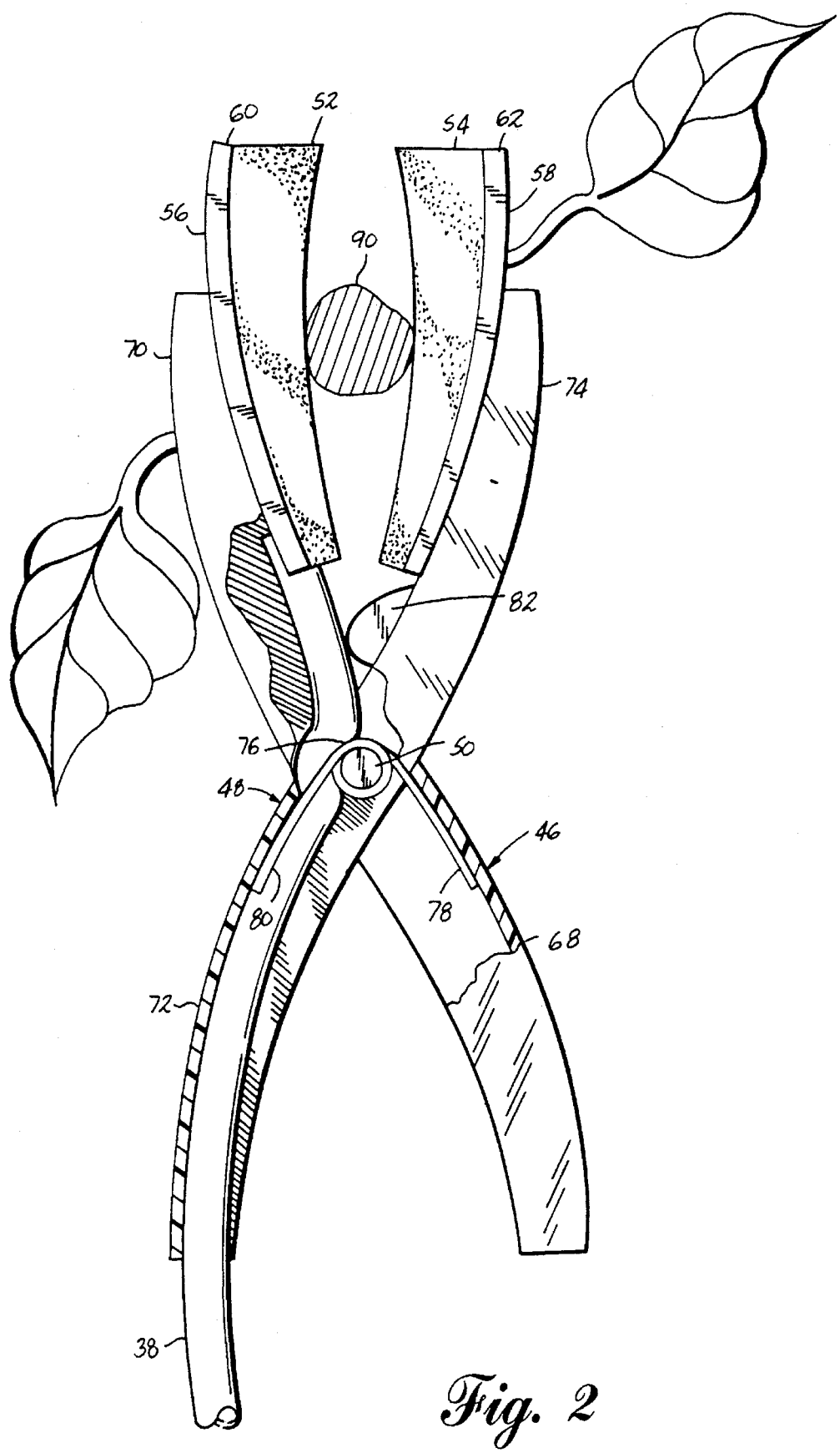
FIG. 2 is a partial sectional view of the applicator handle of FIG. 1 in use.

As seen in FIGS. 1 and 2, the applicator 18 preferably comprises first and second scissor members 46, 48 which are pivotally mounted to one another by a pivot pin 50. First and second applicator pads 52, 54 are mounted to the ends of the first and second scissor members 46, 48, respectively. Preferably, the applicator pads 52, 54 are seated in support pans 56, 58, respectively, formed on the ends of the corresponding first and second scissor members 46, 48. The support pans 56, 58 preferably have side flanges 60, 62, respectively, which extend at least a short distance along the sides of the applicator pads 52, 54. The side flanges 60, 62 help to contain and control the flow of liquid from the applicator pads 52, 54 and protect the user from inadvertent contact with a potentially toxic liquid in the pad.

As seen in FIG. 2, the first scissor member 46 of the applicator 18 comprises a handle portion 68 and a pad portion 70. Similarly, the second scissor member 48 comprises a handle portion 72 and a pad portion 74. The pivot pin 50 extends through the first and second scissor members 46, 48 to pivotally mount the scissor members to one another and divide the members into handle and pad portions.

The distal end 38 of the solution conduit 20 extends to at least one of the pads 52, 54. Preferably, the distal end 38 extends through the handle portion 72 of the second scissor member 48 and the pad portion 70 of the first scissor member 46, ultimately terminating at the first applicator pad 52. The solution conduit 20 establishes a conduit for fluid communication between the pump mechanism 16 and the applicator pads. A coil spring 76 is mounted about the pivot pin 50 and has a first end 78 which bears against the handle portion 68 of the first scissor member 46 and a second end 80 which bears against the handle portion 72 of the second scissor member 48. The spring 76 preferably biases the scissor members 46, 48 into the closed position, wherein the applicator pads 52, 54 abut one another.

In the closed position, a projection 82 mounted to the inside surface of the pad portion 74 of the second scissor member 48 bears against and pinches closed the solution conduit 20 extending through the handle portion 68 of the first scissor member 46. Therefore, when the scissor members are closed, fluid within the solution conduit 20 cannot flow to the applicator pad 52, and vice versa. When the user squeezes the handle portions 68, 72 toward one another to overcome the bias of the coiled spring 76, the projection 82 is retracted from pinching contact with the solution conduit 20, thereby permitting the free flow of fluid through the full length of the conduit 20. However, it may be necessary to keep the stop clamp 42 open in order to permit the flow of fluid through the conduit 20.

In use, the liquid to be applied is stored inside the bottle 14. When the user is ready to apply the liquid through the applicator 18, the user first releases the clamp 42 mounted on the solution conduit 20 and then pumps the trigger 28. Depending upon the particular pumping conditions, it may be necessary to squeeze the applicator handles to open the distal end of the conduit 20 and prevent pressure build-up within the conduit 20. As the trigger 28 is pumped, the liquid is drawn from the bottle 14 through the pump mechanism 16 and discharged into the solution conduit 20 through the outlet nozzle 30. Preferably, the user will hold the applicator 18 and a substantial portion of the body of the solution conduit 20 above the outlet nozzle 30. Therefore, as the user pumps the fluid into the solution conduit 20, all of the air will remain in the upper portion of the solution conduit 20 and the fluid will occupy the lower portion of the conduit 20. When the fluid level inside the solution conduit 20 reaches the fill line 40, then the user ceases pumping the trigger 28 and lowers the applicator 18. Through the force of gravity, the fluid in the solution conduit will flow therethrough to the distal end 38 of the conduit 20. The fluid will remain in the solution conduit 20 until the user squeezes the handles 68, 72 to retract the projection 82 from its clamping contact with the solution conduit 20 and pad portion 70 of the first scissor member 46. With the handles 68, 72 squeezed together, the fluid in the conduit 20 will flow to the applicator pad 52. The applicator pad 52 is preferably an open cell material which will become saturated with the fluid from the conduit 20. When the user releases the squeezing of the handle portions 68, 72 of the scissor members 46, 48, the pads 52, 54 will contact one another and excess fluid in the first pad 52 will flow to the second pad 54.

Figure 3:
FIG. 3 is a side elevational view of the applicator handle in use applying herbicide to vegetation.
Figure 4:
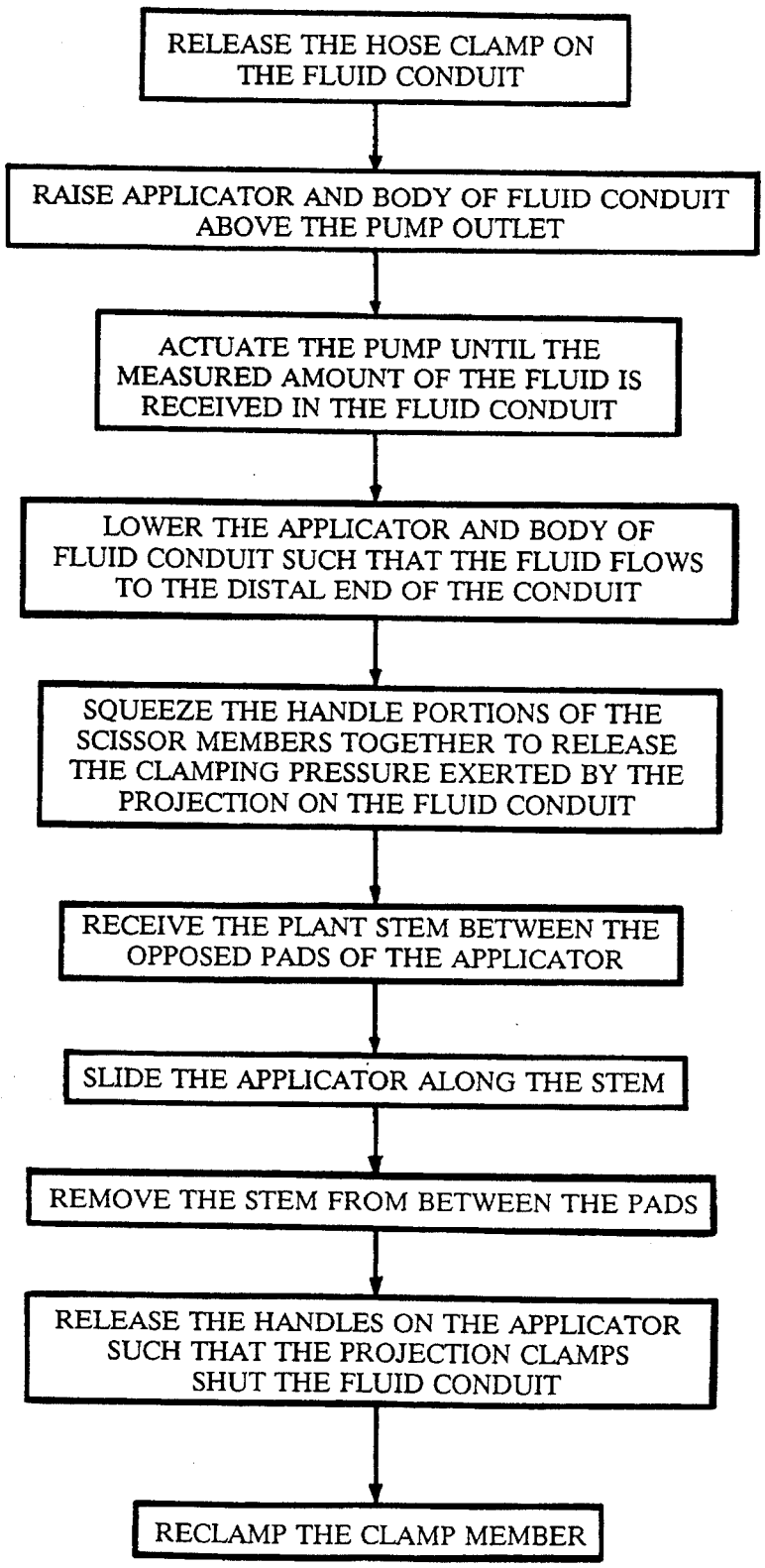
FIG. 4 is a flow chart of the method for applying liquid using the applicator according to the invention.

As seen in FIGS. 2–4, the user applies the liquid, such as a herbicide, to an unwanted plant by grasping the stem or leaves of the plant or weed between the opposed applicator pads 52, 54. First, the user squeezes the handle portion 68, 72 toward one another such that the stem or leaves 90 of the unwanted plant can be received between the opposed pads and then relaxes his grip on the handle portions 68, 72 such that the plant stem 90 is captured between the opposed pads 52, 54 as a result of the bias supplied by the spring 76. The user then slides the applicator 18 along the length of the stem 90 so that the herbicide or fluid contained in the applicator pads 52, 54 is transferred to the plant stem 90 without being sprayed onto the surrounding vegetation.

After the fluid has been applied to the plant stem 90, the handles 68, 72 are again squeezed toward one another thereby opening the opposed pads 52, 54 so that the plant stem 90 can be withdrawn therefrom. The process of pumping a measured amount of fluid and applying the measured amount to multiple plants can be repeated until all offending weeds have been coated with the herbicide. When the user is finished with the project, the spring 76 in the applicator 18 will bias the pads against one another and bias the projection 82 into the clamping position, thereby preventing fluid inside the body of the conduit 20 from flowing to the applicator pads 52, 54. Similarly, the user can re-engage the solution conduit clamp 42 to prevent the inadvertent transferral of fluid from the bottle 14 or pump mechanism 16 into the solution conduit 20. Finally, the distal end 38 of the solution conduit 20 can be placed between the opposed fingers of the U-shaped retaining clip 32 to securely mount the applicator 18 to the pump mechanism 16.

The basic structure of the applicator assembly can be modified in several ways and still accomplish the same function. For example, the second applicator pad can be fluidly interconnected to the distal end of the solution conduit such that fluid flows freely to both applicator pads when the clamping projection is withdrawn from the solution conduit. Alternatively, the applicator pads can be mounted at the ends of a long applicator rod with a mechanical interconnection extending upwardly from the end of the rod such that the handles can be opened and closed a significant distance from the applicator pads. With this structure, a user can apply the fluid to weeds without bending over.

While the use of the invention has been described specifically for the application of herbicides, the applicator assembly according to the invention can be used with any liquid in which controlled application thereof is desired.

Reasonable variation and modification are possible within the spirit of the foregoing specification and drawings without departing from the scope of the invention.

The embodiments for which an exclusive property or privilege is claimed are defined as follows:

1. An applicator assembly for the controlled application of fluid to a surface, the assembly comprising:

a fluid reservoir;

a pump mechanism having an inlet and an outlet, the inlet of the pump mechanism being in fluid communication with the fluid reservoir;

a fluid conduit having a proximal end and a distal end, the proximal end being mounted to the outlet of the pump mechanism and;

an applicator mounted to the distal end of the fluid conduit, the applicator comprising:

a pair of opposed support members movable with respect to one another between a first position wherein a portion of one support member is disposed away from a portion of the other support member and a second position wherein the portion of each support member is disposed nearer to each other;

at least one applicator pad mounted to the portion of one of the support members, the at least one applicator pad being in fluid communication with the fluid conduit;

a spring to bias the opposed support members toward the second position; and a clamping projection positioned to compress the fluid conduit intermediate the pump mechanism and the at least one applicator pad when the opposed support members are in one of the first and second positions;

whereby fluid is selectively supplied to the at least one applicator pad from the fluid reservoir by pumping the pump mechanism to supply fluid to the fluid conduit and biasing the opposed support members to the other of the first and second positions so that the fluid in the fluid conduit flows to the at least one applicator pad.

2. An applicator assembly according to claim 1 wherein the pair of opposed support members are pivotally mounted to one another.

3. An applicator assembly according to claim 2 wherein each one of the pair of opposed support members comprises a handle portion and a pad portion, the at least one applicator pad being mounted to the pad portion of one of the pair of opposed support members.

4. An applicator assembly according to claim 3 and further comprising a second applicator pad mounted to the pad portion of the other of the pair of opposed support members.

5. An applicator assembly according to claim 3 wherein the pair of opposed support members are pivotally mounted to one another, intermediate the handle and pad portions.

6. An applicator assembly according to claim 5 wherein the clamping projection is mounted to the pad portion of one of said pair of opposed support members and the spring biases the projection into contact with the fluid conduit such that the projection closes the fluid conduit in the first position of the support members.

7. An applicator assembly according to claim 1 and further comprising a clamp member mounted to the fluid conduit intermediate the outlet of the pump mechanism and clamping projection, the clamp member being movable between first and second positions, wherein, in the first position the clamp member prevents the flow of fluid between the outlet and clamp projection and in the second position the fluid freely flows between the outlet and clamping projection.

8. An applicator assembly according to claim 1 and further comprising at least one measuring indicator mounted on the fluid conduit a spaced distance from the outlet.

9. An applicator assembly according to claim 1 and further comprising a retainer member mounted to one of the pump mechanism and the fluid reservoir, the retainer member being adapted to secure the fluid conduit and applicator to the fluid reservoir and pump mechanism when not in use.

10. An applicator assembly according to claim 1 wherein the opposed support members comprise a pan formed on the support member adapted to support a rear surface of the pad and a side flange extending substantially normal from the pan to surround at least a portion of a perimeter surface of the pad.

11. An applicator assembly for the controlled application of fluid to a surface, the assembly comprising:

a fluid reservoir;

a pump mechanism having an inlet and an outlet, the inlet of the pump mechanism being in fluid communication with the fluid reservoir;

a fluid conduit having a proximal end and a distal end, the proximal end being mounted to the outlet of the pump mechanism;

an applicator mounted to the distal end of the fluid conduit, the applicator comprising:

a pair of scissor members pivotally mounted to one another, each of the scissor members comprising a handle portion and a pad portion, the handle portions and pad portions of the pair of scissor members being opposed to one another;

a first applicator pad mounted to the pad portion of one of the pair of scissor members, said first applicator pad being in fluid communication with the fluid conduit;

a spring to bias the opposed pad portions of the pair of scissor members toward one another; and a clamping projection mounted to one of the pair of scissor members, the clamping projection being positioned to pinch closed the fluid conduit in response to the spring bias;

whereby, fluid is supplied to the applicator pad by actuating the pump mechanism to draw the fluid from the fluid reservoir and discharging the fluid out of the outlet and into the fluid conduit, and then supplied to the applicator pads by squeezing the handle portions of the pair of scissor members to overcome the bias of the spring so that the clamping projection is withdrawn from pinching closed the fluid conduit resulting in the fluid in the fluid conduit flowing to the applicator pad for application to the desired surface.

12. An applicator assembly according to claim 11 and further comprising a second applicator pad mounted to the pad portion of the other of the pair of scissor members.

13. An applicator assembly according to claim 11 wherein the pair of scissor members are pivotally mounted to one another, intermediate the handle and pad portions.

14. An applicator assembly according to claim 11 and further comprising a clamp member mounted to the fluid conduit intermediate the outlet of the pump mechanism and clamping projection, the clamp member being movable between first and second positions, wherein, in the first position the clamp member prevents the flow of fluid between the outlet and clamping projection and in the second position the fluid freely flows between the outlet and clamping projection.

15. An applicator assembly according to claim 11 and further comprising at least one measuring indicator mounted on the fluid conduit a spaced distance from the outlet.

16. A method for the controlled application of a liquid to a surface comprising the steps of:
  providing an applicator comprising:
    a fluid reservoir;
    a pump mechanism having an inlet and an outlet, the inlet of the pump mechanism being in fluid communication with the fluid reservoir;
    a fluid conduit having a proximal end and a distal end, the proximal end being mounted to the outlet of the pump mechanism;
    an applicator mounted to the distal end of the fluid conduit, the applicator comprising:
      a pair of opposed support members movable with respect to one another between first and second positions;
      at least one applicator pad, said pad mounted to one of the support members and said at least one applicator pad being in fluid communication with the fluid conduit;
      a spring to bias the opposed support members into the first position; and
      a clamping projection positioned to selectively compress the fluid conduit intermediate the pump mechanism and the at least one applicator pad when the opposed support members are in one of the first and second positions;
  actuating the pump mechanism to draw fluid from the reservoir into the fluid conduit;
  moving the pair of opposed support members to the other of the first and second positions thereby allowing the fluid to flow from the fluid conduit into the at least one applicator pad; and
  contacting the surface with the at least one applicator pad to cause the fluid in the pad to flow onto the surface.

17. A method for the controlled application of a liquid to a surface according to claim 16 and further comprising the step of lifting the applicator and a substantial portion of the fluid conduit above the outlet of the pump mechanism prior to the step of actuating the pump mechanism and holding the application in this position during actuation of the pump mechanism.

18. A method for the controlled application of a liquid to a surface according to claim 17 and further comprising the step of actuating the pump to draw a measured amount of fluid into the fluid conduit.

19. A method for the controlled application of a liquid to a surface according to claim 18 and further comprising the steps of lowering the applicator and the substantial portion of the fluid conduit below the outlet after the fluid has been pumped into the fluid conduit so that the measured amount of fluid in the fluid conduit will flow by the force of gravity to the distal end of the fluid conduit.

\* \* \* \* \*

UNITED STATES PATENT AND TRADEMARK OFFICE
CERTIFICATE OF CORRECTION

PATENT NO. : 5,499,474
DATED : March 19, 1996
INVENTOR(S) : Louis D. Knooihuizen It is certified that error appears in the above-indentified patent and that said Letters Patent is hereby corrected as shown below:

Column 8, claim 17, line 25:
    "application" should be --applicator--.

Signed and Sealed this

Twenty-fifth Day of June, 1996

Attest:

BRUCE LEHMAN

Attesting Officer      Commissioner of Patents and Trademarks